US00RE42167E

(19) United States
(12) Reissued Patent
Morgan, III

(10) Patent Number: US RE42,167 E
(45) Date of Reissued Patent: Feb. 22, 2011

(54) INFORMATION MANAGEMENT, RETRIEVAL AND DISPLAY SYSTEMS AND ASSOCIATED METHODS

(75) Inventor: George J. Morgan, III, Wooster, OH (US)

(73) Assignee: EvREsearch Ltd., Columbus, OH (US)

(21) Appl. No.: 10/346,505

(22) Filed: Jan. 16, 2003

Related U.S. Patent Documents

Reissue of:
(64) Patent No.: 6,175,830
Issued: Jan. 16, 2001
Appl. No.: 09/315,316
Filed: May 20, 1999

(51) Int. Cl.
*G06F 7/00* (2006.01)
*G06F 17/00* (2006.01)

(52) U.S. Cl. ..... 707/758; 707/771; 707/778; 706/47

(58) Field of Classification Search ..... 707/1–10, 707/100–102, 104.1, 200–201, 758, 771, 707/778; 704/1, 9; 706/47
See application file for complete search history.

(56) References Cited

U.S. PATENT DOCUMENTS 5,265,065 A * 11/1993 Turtle ..... 707/4
5,404,510 A * 4/1995 Smith et al. ..... 707/2
5,537,586 A * 7/1996 Amram et al. ..... 707/3
5,546,529 A * 8/1996 Bowers et al. ..... 715/848
5,642,502 A * 6/1997 Driscoll ..... 707/5
5,675,710 A * 10/1997 Lewis ..... 706/12
5,708,806 A * 1/1998 DeRose et al. ..... 707/104.1
5,748,975 A * 5/1998 Van De Vanter ..... 715/531

(Continued)

FOREIGN PATENT DOCUMENTS

JP 06-301721 10/1994

OTHER PUBLICATIONS

Liddy, E.D. and Myaeng S. H. "DR–LINK System: Phase I Summary" Proceedings of the TIPSTER Phase I Final Report, Sep. 1993 (published 1994), pp. 93–110.*

*Primary Examiner*—Miranda Le
(74) *Attorney, Agent, or Firm*—Baker & Hostetler LLP

(57) ABSTRACT

An information management, retrieval and display system searches through an informational resource, such as a document (e.g., a treaty), a number of individual documents (e.g., Web pages resident on the Internet), or a stream of information (e.g., DNA code, source code, satellite data transmissions, etc.) and displays the results of the search in an collapsible/expandable format based upon a user-selected display criteria or hierarchy. Such a display hierarchy will allow the end-user to effectively and quickly obtain items of interest from the search results. Generally, the system performs a method for retrieving information from an informational resource that includes the steps of: (a) dividing the informational resource into a plurality of finite elements; (b) assigning a categorical tag to each of the plurality of finite elements, where the categorical tag includes data pertaining to a content of the finite element; (c) generating a searchable database record for each of the plurality of finite elements, where each searchable database record includes at least one string contained within the finite element, where the string can be a word, a phrase, a symbol, a group of symbols, a data segment or the like; (d) supplying a search string; (e) searching the searchable database for searchable database records containing the search string; (f) arranging the results of the searching step in a hierarchal structure according, at least in part, to the data in the categorical tags assigned to the finite elements found in the searching step; and (g) displaying the results of the searching step in the hierarchal structure.

92 Claims, 7 Drawing Sheets

U.S. PATENT DOCUMENTS 5,778,157 A * 7/1998 Oatman et al. ..... 706/46
5,784,608 A * 7/1998 Meske et al. ..... 707/2
5,790,121 A * 8/1998 Sklar et al. ..... 715/853
5,848,410 A * 12/1998 Walls et al. ..... 707/4
5,852,819 A * 12/1998 Beller ..... 707/1
5,855,015 A * 12/1998 Shoham ..... 707/5
5,864,863 A * 1/1999 Burrows ..... 707/103 R
5,870,559 A * 2/1999 Leshem et al. ..... 709/224
5,870,735 A * 2/1999 Agrawal et al. ..... 707/3
5,890,147 A * 3/1999 Peltonen et al. ..... 707/1
5,895,470 A * 4/1999 Pirolli et al. ..... 707/102
5,924,090 A * 7/1999 Krellenstein ..... 707/5
5,948,058 A * 9/1999 Kudoh et al. ..... 707/7
5,953,718 A * 9/1999 Wical ..... 707/5
5,960,383 A * 9/1999 Fleischer ..... 704/9
5,963,940 A * 10/1999 Liddy et al. ..... 707/5
5,977,971 A * 11/1999 Guzak et al. ..... 715/853
5,983,246 A * 11/1999 Takano ..... 715/514
5,999,925 A * 12/1999 Evans ..... 707/5
6,006,221 A * 12/1999 Liddy et al. ..... 707/5
6,006,223 A * 12/1999 Agrawal et al. ..... 707/5
6,112,181 A * 8/2000 Shear et al. ..... 705/1
6,122,643 A * 9/2000 Paik et al. ..... 707/104.1
6,154,737 A * 11/2000 Inaba et al. ..... 707/3
6,154,757 A * 11/2000 Krause et al. ..... 715/530
6,185,576 B1 * 2/2001 McIntosh ..... 707/200
6,223,145 B1 * 4/2001 Hearst ..... 703/22
6,236,400 B1 * 5/2001 Guerrero ..... 715/841
6,278,991 B1 * 8/2001 Ebert ..... 707/3
6,405,238 B1 * 6/2002 Votipka ..... 709/203
6,418,429 B1 * 7/2002 Borovoy et al. ..... 707/3
6,466,940 B1 * 10/2002 Mills ..... 707/102
2001/0039544 A1 * 11/2001 Chakrabarti et al. ..... 707/5
2001/0044795 A1 * 11/2001 Cohen et al. ..... 707/5

* cited by examiner

INFORMATION MANAGEMENT, RETRIEVAL AND DISPLAY SYSTEMS AND ASSOCIATED METHODS

Matter enclosed in heavy brackets [ ] appears in the original patent but forms no part of this reissue specification; matter printed in italics indicates the additions made by reissue.

BACKGROUND

The present invention is a computerized system and method for searching through and retrieving information from an informational resource; and more particularly, the present invention is an information management, retrieval and display system for searching through an informational resource and for displaying the results of the search in an collapsible/expandable format based upon a user-selected display criteria or hierarchy.

An inherent drawback in many conventional search engines or search tools, such as Infoseek™, AltaVista™, Hotbot™, is that the results of the search are typically organized according to the number of hits that the search word or phrase made in each document (Web page) being searched. This type of search result display requires the end user to go through the hits one by one in order to finally access the document he/she was looking for. Another drawback with such conventional search engines is that the results of the search do not take into account that a word may have several different meanings, and may be used in many different contexts. For example, if an end user were looking for information on a cartoon mouse, because the search query would contain the word "mouse," the list of hits will include documents for the electronic cursor-control devices, documents providing biological information on mice, documents providing pet information on mice, etc. Therefore, the end user may have to go through an enormous number of these hits before finally (if ever) reaching a hit related to the cartoon mouse.

Thus, there is a need for a search engine or search tool that allows the end user to that arranges the search results in a manner that allows the end user to effectively and quickly obtain items of interest.

SUMMARY

The present invention is an information management, retrieval and display system for searching through an informational resource, such as a document (e.g., a treaty), a number of individual documents (e.g., Web pages resident on the Internet), or a stream of information (e.g., DNA code, source code, satellite data transmissions, etc.) and for displaying the results of the search in an collapsible/expandable format based upon a user-selected display criteria or hierarchy. Such a display hierarchy will allow the end-user to effectively and quickly obtain items of interest from the search results. The type or format of the informational resource is not critical.

The invention includes four primary modules, a break module, an indexing module, a search module and an un-break module. The break module is an expert system operating upon a set of expert rules that define its operation. The break module parses through the informational resource to break up the informational resource into finite elements (such as paragraphs, sections, sub-sections, segments etc.). The break module also creates categorical tags for each of these finite elements, where the categorical tags assigned to each of the finite elements are based upon and analysis (defined by the set of expert system rules) of the contents of each of the finite elements. The categorical tag can include a standard classification such as, for example, "Dewey Decimal-type" number. The categorical tag can also include an organizational attribute (such as pertaining to the type or location of the finite element with respect to the rest of the rest of the informational resource), a date-stamp, a categorical word, etc. Preferably, the categorical tags are inserted into the finite element.

The index module parses through the finite elements identified/created/processed by the break module and creates a searchable database having a database record for each of the finite elements identified by the break module. The searchable database is a type of reverse index, where each record includes an address or location of the corresponding finite element (and, in turn, the categorical tag included therewith), and strings (such as words, phrases, etc.) contained in the finite element and their frequency (i.e., their weight) within the finite element.

In applications where the users of the invention do not have control of the information being searched (i.e., Web pages on the Internet), each database record may also include the categorical tag, since the categorical tag will not be able to be inserted by the break module into the finite elements themselves. Furthermore, with the Web search application, it may not be necessary to utilize the break and un-break modules at all since each Web-page or link might be considered a finite-element for the purposes of the present invention.

Once the reverse index is created, a search of the reverse index may be performed. Key strings (such as key words, phrases or symbol segments) may be supplied by an end user as a search query, and a display hierarchy or criteria may also be selected or defined by the user. The selected display criteria will instruct the search module how to manipulate the data of the search results. Specifically, the selected display criteria will define if the search results are to be displayed in an order or structure based entirely upon the information contained within the categorical tags (research-centric), if the search results are to be displayed in an order depending entirely upon the frequency of the key strings present in the finite elements (conventional), or if the search results are to be displayed in an order or structure based upon a combination of the two (document-centric).

The search module accesses the search query and searches through the reverse index for database records matching the specific search term or query. The search results are then displayed in an collapsible/expandable (tree) structure by applying the information in the categorical tags for each of the finite elements satisfying the search criteria to the selected display hierarchy. For example, if the selected hierarchy is a document-centric hierarchy, a first level of the display hierarchy may be, for example, the year in which the finite element was created; a second level of the display hierarchy may be, for example, the order in which the finite elements appear in the document; and a third level of the display hierarchy may be, for example, based upon the frequency in which the search words appear in each of the finite elements. The operation of the search module, as with the break and index modules, is based upon a set of expert rules. Therefore, if the search results are not satisfactory, the expert rules in the break, index and/or search modules are modified and the procedure is performed again.

Once one of the finite elements in the search result display are selected by the end-user, the un-break module allows the end user to view a contiguous portion of the informational resource that the selected finite element belongs to. The un-break module will assemble selected finite element with other related finite element to reconstruct the contiguous portion of the informational resource. The un-break module refers to the categorical tag of the selected finite element for information related to the location of the finite element with respect to the entire informational resource, and will then build a portion of the informational resource from all of the finite elements belong to that portion. For example, if the selected finite element is a paragraph of a document, the un-break module may be configured to rebuild the chapter of the document to which the paragraph belongs. As with the other modules of the present invention, the operation of the un-break module is controlled by a set of expert rules that may be modified if the results are unsatisfactory.

It is envisioned that the rule sets will be created and refined by an expert on the document or information being searched. For example, if the system of the present invention is to be associated with Volume 37 of the Code of Federal Regulations, an individual (or group of individuals) with intimate knowledge of the Volume would be best suited to generate and fine-tune the rule sets. The fine-tuning of the rule sets would involve the individual continuously performing example searches on the Volume using the rule sets, and continuously modifying the rule sets to obtain the search results with the desired content and format. Once the rule sets have been fine-tuned, the search module of the present invention can be packaged along with the Volume and sold or distributed as a searchable Volume. Likewise, the search module could operate on a Web-site so that users can access the Web-site and perform searches on the Volume. Since the rule sets have already been defined and fine-tuned by the "experts," the users would have a fully operable search engine that performs searches and displays results in accordance with an expert's intimate knowledge with the Volume.

As mentioned above, it is also envisioned that an embodiment of the invention is designed to search through a number of individual Web pages resident on the Internet and to display the results of the search in an collapsible/expandable format based upon a user-selected display criteria or hierarchy. In such an embodiment, a break module in the form described above may not be necessary because each Web page may already be considered to be a "finite element" and the search engine will not be able to modify the Web pages. Accordingly, in such an application, the index module will parse through each of the Web pages (finite elements) to create a searchable database having a record for each of the Web pages. Each record in the searchable database will include the Web address of the Web page, non-common words contained in the Web page along with their frequency (weight), and a categorical tag, as described above, which includes data based upon an analysis of the contents of the Web page. The index module will also review each of the Web pages to determine if the creator of the Web page had embedded a categorical tag into the Web page itself; and if such an embedded categorical tag is found, the index module may simply insert this pre-defined categorical tag into the database record rather than creating one itself. Therefore, as the present invention becomes more prevalently used on the Internet, Web page creators may desire to create their own categorical tags for their Web pages rather than having the search engine create one for them. With this feature, the Web page designer may be able to influence the search results, perhaps to achieve a more accurate depiction of the Web site. Of course, such a feature may also be used by the Web designers in a deceptive manner, where the categorical tag will cause the Web page to be listed in search results when the searcher is looking for an entirely different type of information. Recognizing this potential problem, the index module will include an option where it will compare the actual contents of the Web page against the embedded categorical tags, and will create a new categorical tag to be inserted into the database record if there is a significant difference. Likewise, the index module can be configured to filter out Web sites having undesirable or unsavory content as indicated by the embedded categorical tags or as determined by a review of the content of the Web page itself.

In another embodiment of the invention, the dynamic expert rule sets may be configured to accept and index all manner of static and dynamic information (such as newsfeeds, data transmissions, etc.) on a global scale where an end-user will be able to efficiently and quickly obtain any sort of information he/she wishes from a hierarchal search result display based upon a categorical organization scheme such as the Dewey-Decimal system.

Thus, in one aspect of the present invention, a method for retrieving information from an informational resource comprises the steps of: (a) dividing the informational resource into a plurality of finite elements; (b) assigning a categorical tag to each of the plurality of finite elements, where the categorical tag includes data pertaining to a content of the finite element; (c) generating a searchable database record for each of the plurality of finite elements, where each searchable database record includes at least one string contained within the finite element, where the string can be a word, a phrase, a symbol, a group of symbols, a data segment or the like; (d supplying a search string; (e) searching the searchable database for searchable database records containing the search string; (f) arranging the results of the searching step in a hierarchal structure according, at least in part, to the data in the categorical tags assigned to the finite elements found in the searching step; and (g) displaying the results of the searching step in the hierarchal structure.

The informational resource may be a single document, a plurality of documents or a stream of data, and the step of identifying the finite elements may include the steps of identifying sections or sub-sections within the document(s) or data stream or by simply identifying the documents themselves. The step of dividing the informational resource into a plurality of finite elements is preferably performed by an expert system according to a rule set; and the step of assigning a categorical tag to each of the plurality of finite elements is also preferably performed by an expert system according to another rule set. If unsatisfactory results are obtained in step (g) above, one or both of the rule sets may be modified by the end user and the steps (a) through (g) may be performed again.

Each database record preferably includes an address or pointer to the corresponding finite element and further preferably includes all of the non-common strings (e.g., words or phrases) contained within the corresponding finite element along with the frequency that such strings appear.

In another aspect of the present invention, a method for retrieving information from an informational resource includes the steps of: defining a first rule set for dividing the informational resource into a plurality of finite elements; utilizing the first rule set, dividing the informational resource into a plurality of finite elements; defining a second rule set for creating a categorical tag for one of the plurality of finite elements; utilizing the second rule set to create a categorical tag for each of the plurality of finite elements; generating a searchable database including a searchable database record for each of the finite elements; searching the searchable database for relevant database records; associating the relevant database records found in the search with corresponding relevant finite elements; selecting a hierarchy for displaying identifying phrases pertaining to the relevant finite elements; ordering the relevant finite elements in the hierarchy according, at least in part, to the categorical tag for each of the finite elements; and displaying the identifying phrases pertaining to the relevant finite elements according to the results of the ordering step.

In another aspect of the present invention, a data storage device (such as a CD ROM) is provided, which comprises: an informational resource divided into a plurality of finite elements, where each of the finite elements includes a categorical tag and a database record assigned thereto, where the categorical tag includes data pertaining to a content of the finite element and the database record includes at least one string contained within the finite element; and also comprises software instructions programmed to retrieve and display at least a portion of the informational resource. The software instructions are configured to perform the steps of: supplying a search string, searching through the database records for relevant database records containing the search string, arranging the results of the searching step in a hierarchal structure according to the information in the categorical tags assigned to the finite elements corresponding to the relevant database records, and displaying identifying phrases for the finite elements corresponding to the relevant database records in the hierarchal structure.

DETAILED DESCRIPTION

The present invention is an information management, retrieval and display system for searching through an informational resource, such as a document (e.g., a treaty), a number of individual documents (e.g., Web pages resident on the Internet), or a stream of information (e.g., DNA code, source code, satellite data transmissions, etc.) and for displaying the results of the search in an collapsible/expandable format based upon a user-selected display criteria or hierarchy. Such a display hierarchy will allow the end-user to effectively and quickly obtain items of interest from the search results.

Figure 1:
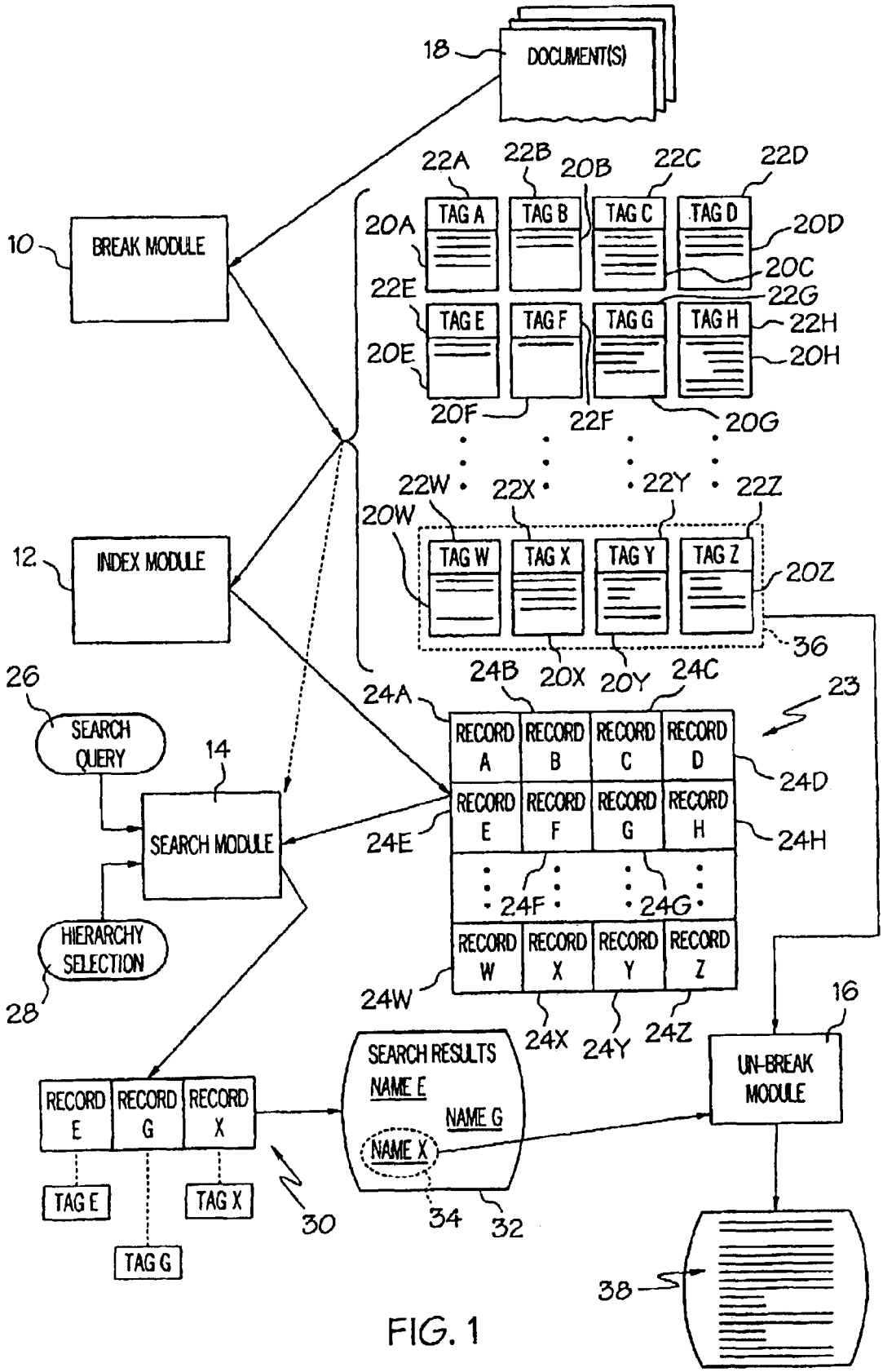
FIG. 1 is a schematic flow-diagram representation of the operation of a first embodiment of the present invention.

As shown in FIG. 1, in a first embodiment of the invention, the information management, retrieval and display system includes four primary modules, a break module 10, an indexing module 12, a search module 14 and an un-break module 16. Each of these processing modules are preferably expert engines operating upon a set of expert rules that define the operation of the individual module. As will be described in further detail below, the expert rules for these modules are preferably generated by a person or persons having intimate knowledge of the document or documents 18 being searched; and the fine tuning of the expert rules is a iterative process where the expert will modify or change the rules of one or more of the above modules if a search through the document or documents proves to be unsatisfactory.

The break module 10 parses through an informational resource, such as a group of documents 18 to break up the group of documents into "finite elements" 20a–20z. Each finite element is a user-defined "basket" of information from documents that is to be individually indexed and searched. The finite element is usually not a single word, phrase or symbol, but is a section or portion of an informational resource that can be identified and isolated by the break module. A simple example of a finite element would be the individual paragraphs of a document. Other examples of finite elements would include sub-chapters of a document, individual pages of a document, and other types of identifiable sections of a document. In some instances, the finite element can be the entire document itself. The break module is also responsible for analyzing the contents of each finite element 20a–20 z and creating a categorical tag 22a–22z for each finite element, which is to be inserted into the finite element. The categorical tags 22a–22z may include a standard classification based upon the content analysis such as, for example, a "Dewey Decimal" type number, or some other categorical reference number. The categorical tag may also include an organizational attribute such as pertaining to the type of finite element or the location of the finite element within the document, a date stamp, a categorical word or phrase summarizing the contents of the finite element, etc. As will be discussed in detail below, the contents of each categorical tag provides information to the search module 12 so as to assist the search module in creating the hierarchical display of the search results.

The index module parses through each of the finite elements created by the break module and creates a searchable database 23 including a database record 24a–24z for each of the finite elements created by the break module. The searchable database 23 is a type of reverse index, where each record 24a–24z includes an address or location of the corresponding finite element and all words contained within the finite element (preferably excluding common words such as "and," "in," "the," . . . ) along with their frequency of appearance within the finite element (i.e., their weight).

At some point during the process, a user, which may be an end user or may be the expert developing the rule sets, will enter a search query 26 and an optional hierarchical selection 28. The search query may be any conventional search query as available to those of ordinary skill in the art and may include search words or phrases and/or operators tying the words together. The hierarchy selection informs the search module the type of display format that the user wishes to see the results displayed within. Specifically, the hierarchy selection will inform the search module whether or not the search results are to be displayed in an order or structure based entirely upon the information contained within the categorical tags (research-centric), if the search results are to be displayed in an order depending entirely upon the frequency of the key words or phrases present within the finite elements (conventional), or if the search results are to be displayed in an order or structure based upon a combination of the two (document-centric).

The search module will utilize the search query to search through the database records 24a–24z so as to find the database records 30 matching the words or phrases in the search query. The search module will then, depending upon the selected hierarchy 28, display the search results 32 in an order or collapsible/expandable tree structure based upon information from the categorical tags 22 included in the finite elements 20 that are associated with the records 30 matching the search query. For example, a first level of the display hierarchy might be ordered according to the chapters of a document that the finite elements are contained within. Information regarding the chapters that the finite elements are contained within will be resident within the categorical tags associated with the finite elements. A second level of the display results may order the finite elements for each chapter based upon the weight or frequency that the search words or phrases appear within each finite element. Therefore, on the search results screen the end user will select which chapter he or she would like to view a relevant finite element from and the display will then expand to show the finite elements from that chapter matching the search query. These finite elements contained within this chapter will be ordered depending upon the weight of the search query or words. From there, the user will make a selection 34 indicating to the un-break module 16 which of the finite elements the user wishes to view.

It will be appreciated by those of ordinary skill in the art that the different combinations of ordering schemes and tiers for any given hierarchy is virtually limitless. Other examples of ordering schemes and tiers can be based upon the topic of the finite element, the author or provider of the finite element, the time/date of the finite element, the position of the finite element with respect to the information resource, etc. It is also within the scope of the invention that the hierarchy only include one tier or level of ordering.

While it is preferred that the search module displays the search results in an collapsible/expandible tree structure, it is also within the scope of the invention that the display results be displayed in alternate hierarchal or tiered structures. An example of an alternate hierarchal/tiered structure is the use of a cascaded or tiled display to present the various levels of the hierarchy. Of course, if there is only one tier or level of ordering, the display structure would not need to be collapsible/expandible.

The search module may also be configured to recognize that a string in the search query may have other permeations, which may be used by the search engine to provide matches with the database records. For example, if the search query includes a word in a first language, it is within the scope of the invention for the search module to provide the word in other languages when looking for matches with the database records. Likewise, it is within the scope of the invention for the search module to provide other known forms or tenses of the word; and it is also within the scope of the invention for the search module to provide other search words having a similar or the same meaning.

The un-break module 16 accesses the categorical tag of the selected finite element 34 to determine the other finite elements 36 of the documents 18 that are to be grouped together so as to form the single contiguous display 38. For example, if the selected finite element 34 is a paragraph of the document, the un-break module 16 will refer to the categorical tags of the remaining finite elements to determine the other finite elements 36 that appear on the same page as the selected finite element so as to display the entire page 38 rather than the single paragraph. Likewise, the un-break module can group related finite elements together in a contiguous chapter, section, or other contiguous identifiable portion of the document or documents. Simply put, the un-break module is used for displaying the selected finite element in context with the remaining portions of the informational resource.

While it is preferred that the un-break module is utilized to reconstruct contiguous portions of the informational resource, it is within the scope of the invention to configure the expert rule sets of the un-break module to construct new informational resources using the selected finite elements and other finite elements from the original informational resource. For example, the un-break module may be configured to compile all of the finite elements matching the search query into a new informational resource, using the categorical tags for these finite elements to dictate the order in which the finite elements will be compiled. In another example, the un-break module may be configured to review the categorical tag of the selected finite element to determine other finite elements that are related to the selected finite element based on the date that the finite elements were created, or the author/owner of the finite element, or the content of the finite element; and the un-break module will then construct a new informational resource compiling all of the related finite elements.

Figure 2A:
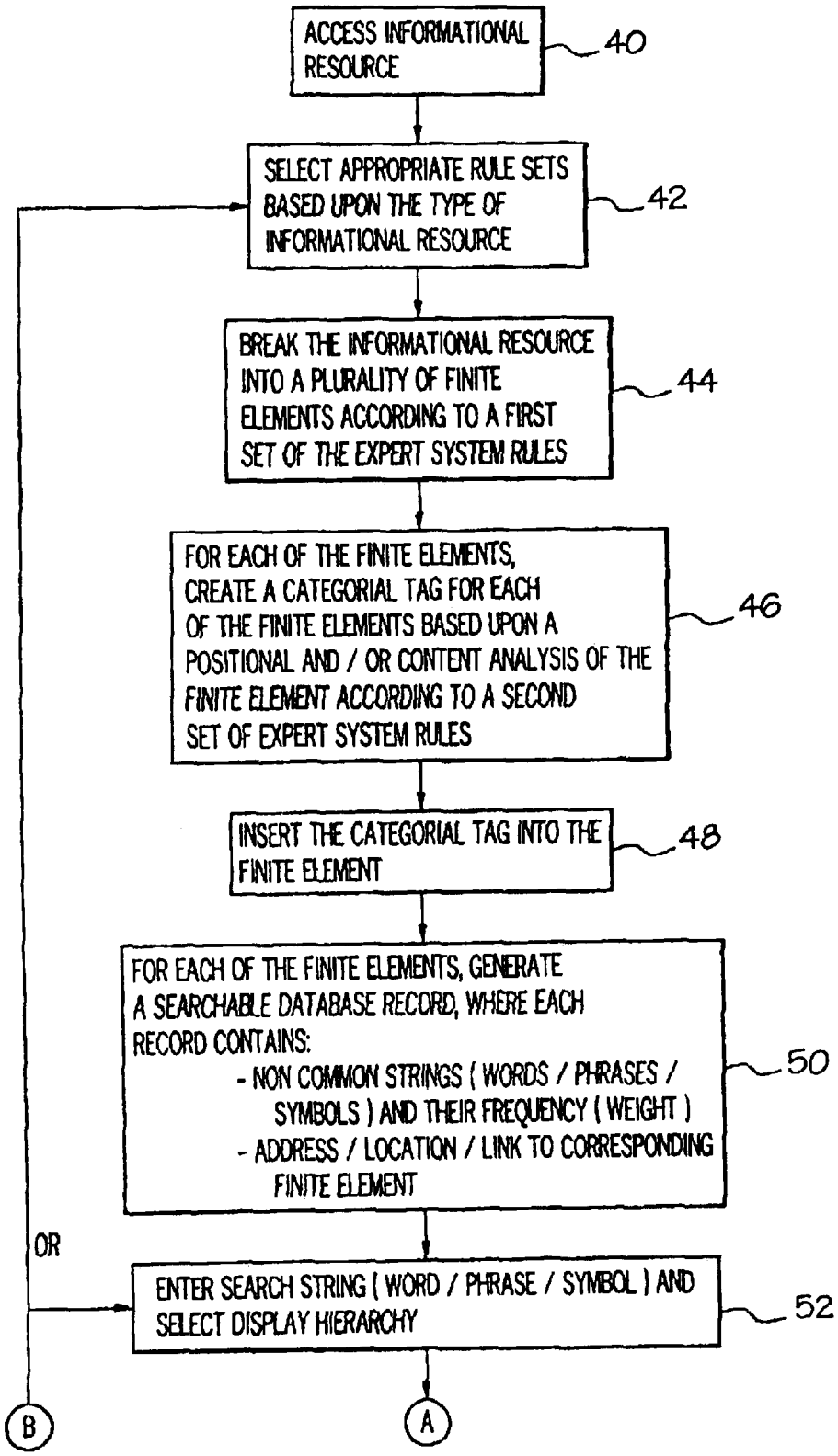
FIGS. 2A and 2B are flow-chart representations of the operation of the embodiment illustrated in FIG. 1.
Figure 2B:
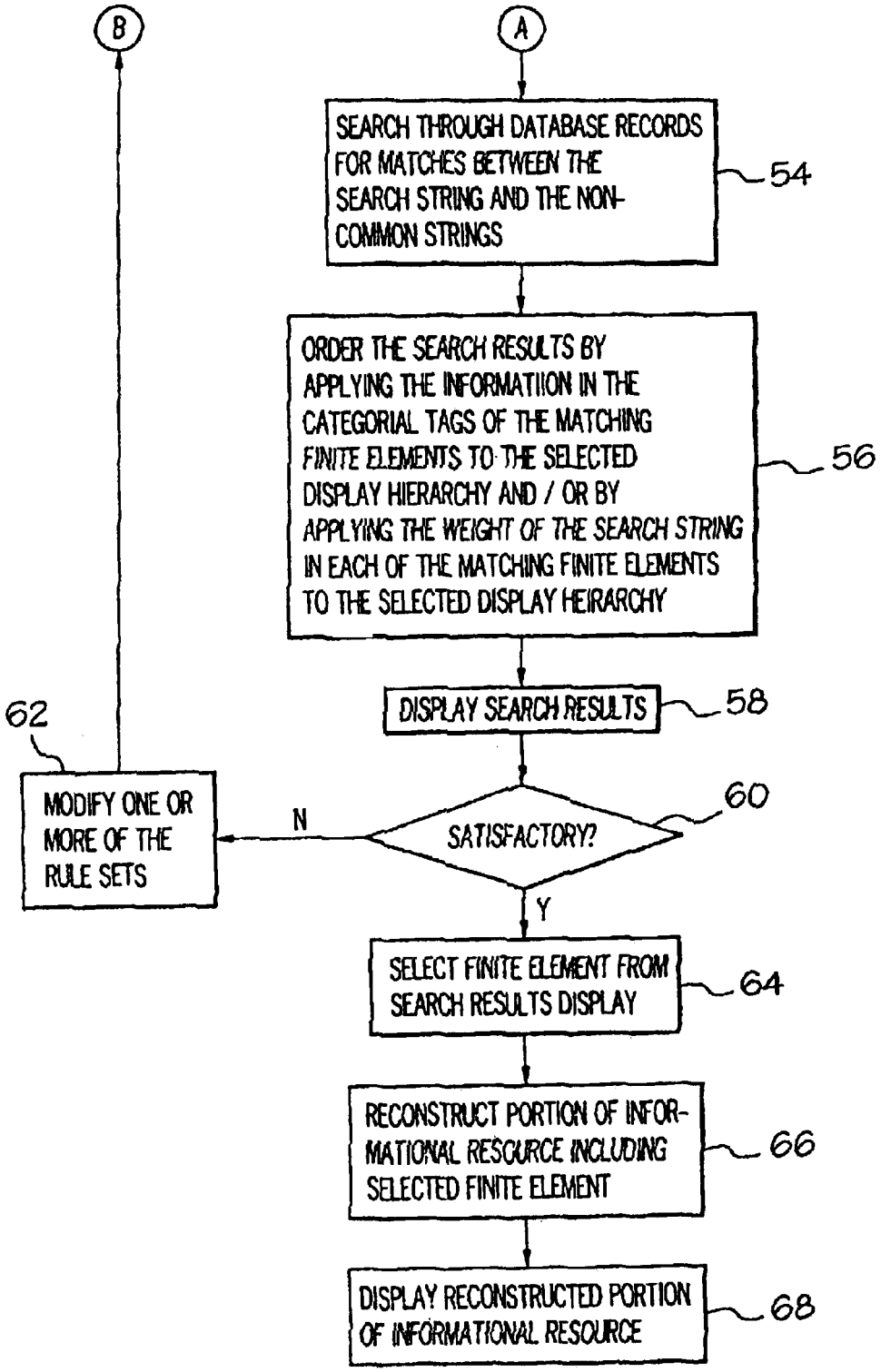

FIGS. 2A and 2B provide a flowchart representation of an operation of the information management, retrieval and display system for the embodiment described above. As shown in functional block 40, a first step is to access the informational resource being examined. As illustrated in functional block 42, the next step is to select the appropriate expert rule sets to apply for searching through the informational resource. The particular rule set selected will depend upon the type of information resource that was accessed in step 40. For example, a set of expert rule sets used for searching through and analyzing the Antarctic Treaty will be different than a set of rule sets used for analyzing and searching through volume 37 of the Code of Federal Regulations. As shown in functional block 44, the next step is to break the information resource into a plurality of finite elements according to a first set of the expert systems rules. As discussed above, this step involves breaking the informational resource into identifiable segments of information such as paragraphs, subsections, pages, chapters, subchapters and the like. An example rule set for breaking the Antarctic Treaty into a plurality of finite elements is provided below in Table 1.

TABLE 1

FINISHED EXAMPLE OF A 'RULE SET' FOR AUTOMATICALLY DIVIDING DOCUMENTS INTO SEGMENTS OR ELEMENTS[1]

| DOCUMENT DIVISION LEVELS | SPECIFIC DOCUMENT DIVISIONS | PATTERN MATCHING RULES |
|---|---|---|
| Primary Level | Antarctic Treaty, Conventions, Protocol and its Annexes | Recognize by bolded large fonts centered on page |
| Secondary Level | Recommendations, Measures, etc. | Recognize by Roman numerals |
| Tertiary Level | Articles within documents from the primary or secondary levels | Recognize by medium fonts centered on page with a colon |
| Grouped Level | Antarctic Treaty Consultative Meeting | Group documents by their Roman numerals |
| Appended Level | Year | Append the signature date for documents at the primary, secondary or grouped levels |

[1]Based on the public-domain documents in the Antarctic Treaty Handbook which has been published since the 1960's by the United States Department of State in hardcopy form only and which now has been converted into a searchable database.

[2]Source codes are described using JAVA but could easily be written in PERL or any other programming language. See Appendix A for example source code segments As shown in the above table, the example rule set is adapted to divide the Antarctic Treaty into a plurality of levels where a primary level of the Treaty, which involves the Antarctic Treaty, Conventions, Protocol and its Annexes, is recognized by the search engine by identifying bold, large font centered on a page. A secondary level, which are the Recommendations and Measures contained within the Treaty, are recognized by the search engine by identifying Roman numerals. A tertiary level is utilized to divide up the primary and secondary levels into smaller finite elements. This tertiary level of finite elements is recognized by the search engine by identifying medium fonts centered on a page with a colon. The remaining levels of the table should be apparent to those of ordinary skill in the art upon analyzing the table and the associated pattern matching rules.

Accordingly, the purpose of the above rule set is to create an automatic tool for matching patterns that distinguish hierarchies, segments or elements within any type of informational resource. The rule set is developed in relation to user-defined requirements for the segments or elements that need to be indexed and searched within the informational resource. It will also be apparent to those of ordinary skill in the art that the rule sets will be greatly simplified in informational resources that include already distinguished segments or elements, such as in separate columns or blocks. Preferably, the rule sets are designed by an expert having intimate knowledge of the informational resource, in an iterative manner utilizing feed-back loops as will be described below.

As shown in functional block 46, a next step is to create a categorical tag for each of the finite elements based upon a positional and/or content analysis of the finite element according to a second set of expert system rules. An example of a rule set for defining categorical tags for finite elements extracted from the Antarctic Treaty is provided below in Table 2.

TABLE 2

EXAMPLE OF CATEGORICAL TAGS THAT WERE AUTOMATICALLY ATTACHED TO FINITE ELEMENTS CREATED WITH THE USER-DEFINED 'RULE SETS' (SEE TABLE 1)[1]

| DOCUMENT DIVISION LEVELS | SPECIFIC DOCUMENT DIVISIONS |
|---|---|
| Primary Level | Antarctic Treaty, Conventions, Protocol and its Annexes |
| Secondary Level | Recommendations, Measures, etc. |
| Tertiary Level | Articles within documents from the primary or secondary levels |
| Grouped Level | Antarctic Treaty Consultative Meeting |
| Appended Level | Year |

[1]Based on the public-domain documents in the Antarctic Treaty Handbook which has been published since the 1960's by the United States Department of State in hardcopy form only and which now has been converted into a searchable database.
[2]Source codes are described using JAVA but could easily be written in PERL or any other programming language. See Appendix A for example source code segments.

As shown in Table 2, the categorical tag will include notation indicating the finite element's position within each of the various identified levels of the Antarctic Treaty. For example, the categorical tag will include information indicating if on a primary level, the finite element is contained within the Antarctic Treaty, the Conventions, the Protocol or its Annexes. On a secondary level, the categorical tag will indicate whether or not the finite element is included in the Recommendations, Measures, etc. As shown in the bottom of the table, the categorical tag for each of the finite elements will also include a content base notation indicating the year that the particular section or finite element was created. Of course, the type and variations of positional and/or content base notations included in the categorical tags are virtually limitless. For example, the rule set may be configured to analyze the contents of the finite element so as to provide a categorical word or phrase which provides a clue to the user as to the contents of the finite element. Similarly, rather than utilizing a word or phrase, the rule set can analyze the contents or position of the finite element to provide a categorical reference number to the finite element, such as a Dewey Decimal type number.

As shown in functional step 48, a next step is to insert the categorical tag created above in step 46 into the finite element created in step 44. As shown in functional block 50, a next step is to generate, for each of the finite elements, a searchable database record. Each database record preferably contains the noncommon strings (e.g., words, phrases, symbols) contained within the finite element along with their frequency (i.e., weight). Furthermore, each database record will include an address, location or link to the corresponding finite element. As shown in functional. block 52, a next step is to enter a search string such as a word, phrase or symbol(s) and to select a display hierarchy. As shown in functional block 54, a next step is to search through the database records created in functional block 50 for matches between the search string and the noncommon strings of the database records. This searching step will identify the relevant database records having noncommon strings matching the search string. As shown in functional block 56, the relevant database records found in the searching step 54 will be ordered by applying information from each of the categorical tags of the relevant database record's associated finite element to the selected display hierarchy and/or by applying the weight of the matching search strings in the relevant database records to the selected display hierarchy.

For example, a first level of the display hierarchy for the Antarctic Treaty might be the year that the finite element was created; the second level might be ordered according to the order of the Articles of the Antarctic Treaty; and a third level of the display hierarchy might be ordered according to the weight of the matching strings contained within the database records.

As shown in functional block 58, a next step would be to display the search results in the collapsible/expandable hierarchy on a display screen. As shown in functional block 60, the user will determine whether the search results were satisfactory, and if not the process will advance to functional block 62 where the user will modify one or more of the rule sets and will return either to functional block 44 or to functional block 52 depending upon which rule sets have been modified.

If, in functional block 60, the search results are satisfactory, the process will advance to functional block 64 where the user will select one of the finite elements from the search results display. Then in functional block 66, the categorical tag of the selected finite element will be used to identify other finite elements that are to be grouped together with the selected finite element to create a contiguous portion of the informational research to be displayed. Finally, in functional block 68, the contiguous portion of the informational resource will be displayed on the display screen or printed.

It is envisioned that an expert having intimate knowledge of the informational resource will develop the rule sets based upon his or her knowledge of the informational resource. Thereafter, once the rule sets have been fully developed, the feed-back portion of the above-described flow chart will no longer be necessary.

Furthermore, once the rule sets have been fully developed, the search module, the un-break module and the fully developed rule sets may be incorporated onto a data storage device (such as a CD ROM, a disk-drive, a floppy-disk and the like) along with an informational resource pre-broken into its plurality of finite elements, where each of the finite elements includes the corresponding categorical tag previously created therefore, along with the pre-created searchable database for the plurality of finite elements. Therefore, such a storage device would essentially provide a searchable document that includes the entire content of the informational resource along with a search engine that has been fined tuned by an expert with intimate knowledge of the informational resource, so that end users of the CD ROM (or other type of storage device) would be able to take advantage of the expert's knowledge and experience in searching through the informational resource contained therewith.

Figure 3:
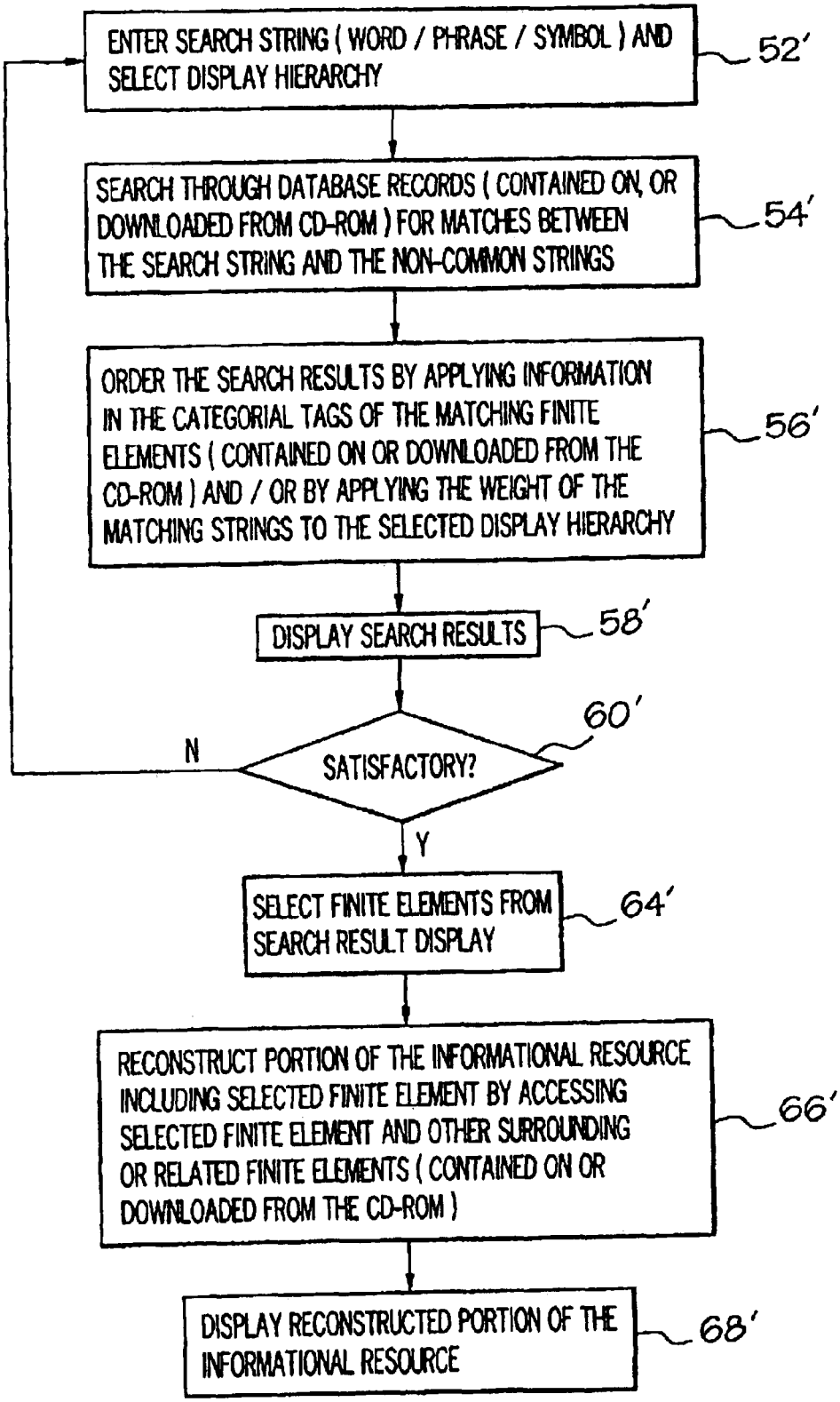
FIG. 3 is a flow-chart representation of an operation of a second embodiment of the invention, resident on a data storage device such as a CD ROM.

As shown on FIG. 3, a flow chart representation of an embodiment of the invention resident on a data storage device, such as a CD ROM, is presented. Essentially, this embodiment is equivalent to the embodiment described in FIGS. 2A and 2B above, except that the development of the rule sets are not longer required. As shown in functional block 52', a first step would be for the end user to enter a search string and select a display hierarchy. In functional block 54', the next step would be for the search module to search through the database records contained on or downloaded from the CD ROM to match the search string with the non-common strings contained in the searchable database records. As shown in functional block 56' the next step would be for the search module to order the search results by applying information in the categorical tags of the matching finite elements (which are contained in, or are downloaded from the CD ROM) and/or by applying the weight of the matching strings to the selected display hierarchy as discussed above. As shown in functional block 58' the next step is to display the search results in preferably a collapsible/expandable hierarchy. As shown in functional block 60', the end user, upon viewing the search results will determine whether or not the results are satisfactory. If not satisfactory, the process will return to functional block 52' where the end user will input a new search string and/or will select a new display hierarchy. If the display results of step 58' are satisfactory, the process will advance to functional block 64' where the end user will select one of the finite elements from the search results display. Advancing to functional block 66' the un-break module will reconstruct the portion of the information resource that includes the selected finite element by accessing the selected finite element and the other surrounding or related finite elements from the CD ROM to create the contiguous portion of the informational resource that included the finite element.

In another embodiment of the present invention the information management, retrieval and display system may be specifically configured to search through a number of individual Web pages resident on the Internet and to display the results of the search in an collapsible/expandable format based upon a user selected display criteria or hierarchy. In such an embodiment, a break module in the form described above may not be necessary because each Web page may already be considered a "finite element" and the search engines will not be able to modify the Web pages. Therefore, with such an embodiment, the search engine will also not be able to insert the categorical into the finite elements. Therefore, in this embodiment, the categorical tags may be either stored separately from the finite elements or incorporated directly into the database records. Furthermore, it is envisioned that the Web page creators may desire to create their own categorical tags for their Web pages rather than having the search engine create one for them. With this feature, the Web page designer may be able to influence the search results, perhaps to achieve a more accurate description of his or her Web site. Of course, in such a feature may also be used by the Web designers in a deceptive manner, where the categorical tag will cause the Web page to be listed in search results when the searcher is looking for an entirely different type of information. Recognizing this potential problem, the index module may include an option where it will compare the actual contents of the Web page against the embedded categorical tags inserted by the Web page designer, and may create a new categorical tag to be inserted in the database record for the Web page if there is a significant difference between the two. Likewise, the search engine can be configured to include an optional filter that will filter out Web sites having unsavory contents as indicated by the embedded categorical tags or as determined upon a review of the content of the Web page itself.

Figure 4:
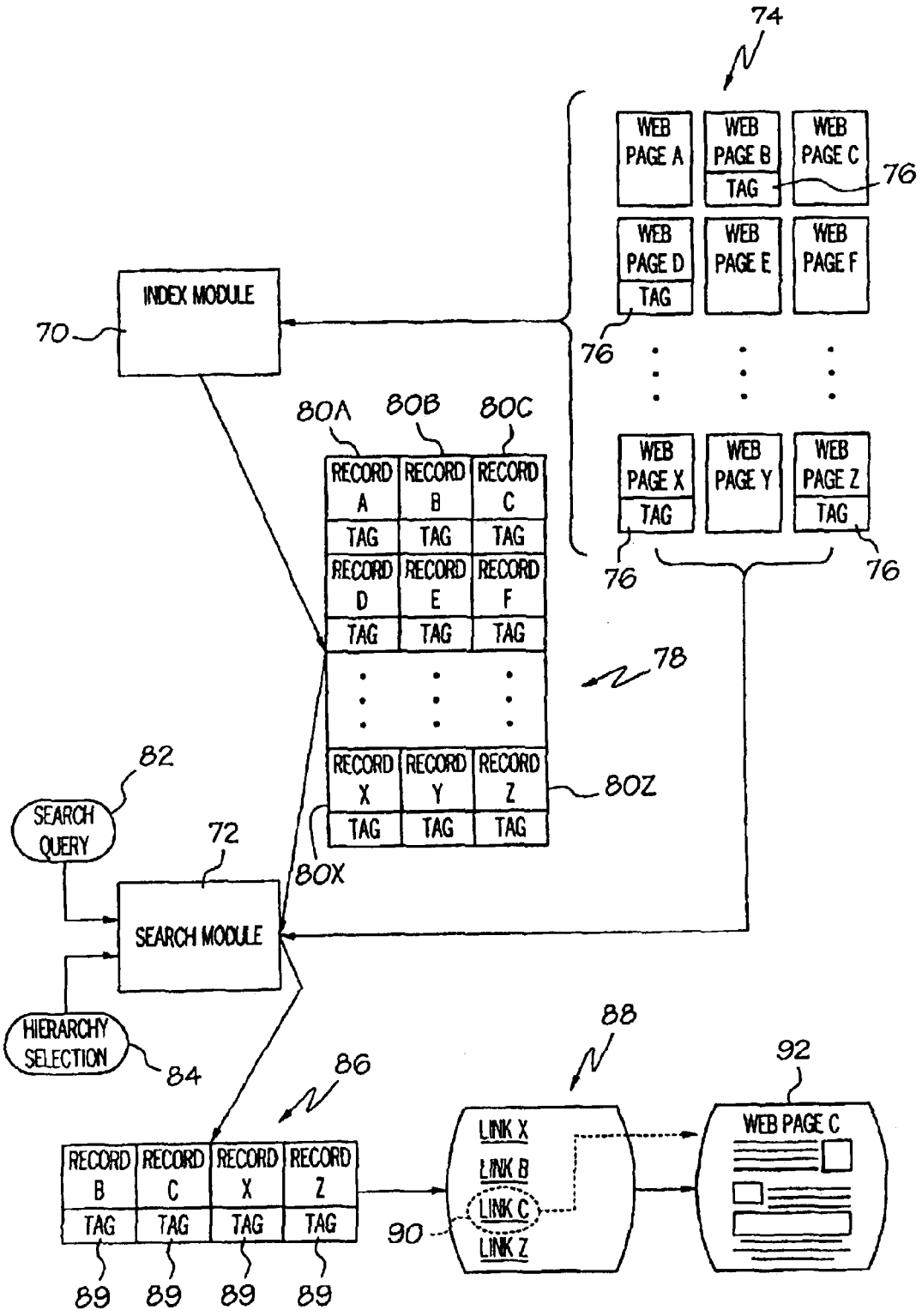
FIG. 4 is a schematic flow-diagram representation of the operation of a third embodiment of the present invention.

As shown in FIG. 4, in such an embodiment of the invention, the information management, retrieval and display system includes two primary modules, an index module 70 and a search module 72. Each of these processing modules are preferably expert engines operating upon a set of expert rules that define the operation of the individual module. The index module 70 will periodically crawl through the volume of Web pages 74 utilizing a conventional Web crawling or Web searching technology such as a spider technology, which is adapted to examine each Web page (or as many as possible) provided on the Internet. As shown in FIG. 4, several of the Web pages may include a predefined, embedded categorical tag 76 included therewith. As discussed above, such an embedded tag 76 would be inserted in the Web page by the Web page designer so that the search engine of FIG. 4 would utilize this predefined embedded categorical tag rather than creating one on its own. An example of a rule from the expert rule set for defining the categorical tag in this embodiment would be to identify the most prominent word or phrase on the initial screen appearing when the Web site is accessed.

The index module 70 will also create a searchable database 78 including a database record 80a–80z for each of the Web pages accessed above. This searchable database 78 is a type of reverse index or each record 80a–80z includes a link to a corresponding Web page, all words contained within the Web page (preferably excluding common words) along with their frequency of appearance within the Web page, and a categorical tag created by the index module or a copy of the categorical tag that was included in the particular Web page as described above. It is envisioned that the index module would constantly be re-accessing the Web pages 74 and updating the searchable database 78, since the contents of Web pages are also constantly being updated or changed.

When a user wishes to conduct a search using the search engine, the user will enter a search query 82 and select an optional hierarchical selection 84. The search query may be any conventional search query as available to those or ordinary skill in the art, it may include a search word or phrases and/or operators tying the words together. The hierarchy selection informs the search module the type of display format that the user wishes to see the results displayed within. Specifically, the hierarchy selection will inform the search module whether or not the search results are to be displayed in an order or structure based entirely upon the information contained within the categorical tags (research-centric), if the search results are to be displayed in an order depending entirely on the frequency of the key words or phrases present within the finite elements (conventional), or if the search results are to be displayed in an order or structure based upon a combination of the two (document-centric).

The search module 72 utilizing a search query 82 to search through the database records, 80a–80z so as to find the database records 86 matching the words or phrases in the search query. The search module will then, depending upon the selected hierarchy 84, display the search results 88 in an order or in a collapsible/expandable tree structure based upon information from the categorical tags 89 included within the database records 87 matching the search query. From the display 88, the user will make a selection 90 of a link to a Web page that he or she wishes to view and the search module will then display the Web page 92 on the display screen.

Figure 5A:
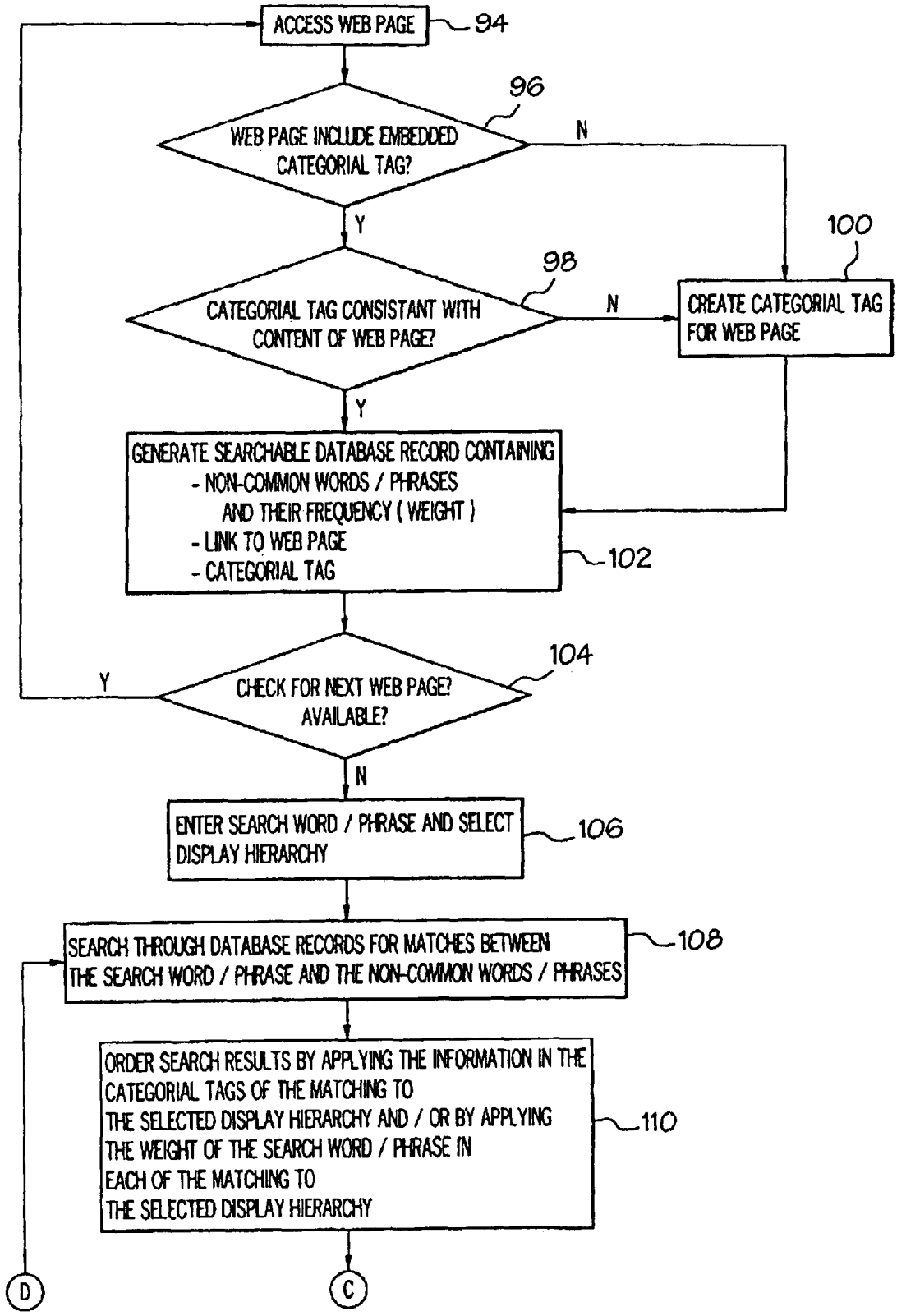
FIGS. 5A and 5B are flow-chart representations of the operation of the embodiment illustrated in FIG. 4.
Figure 5B:
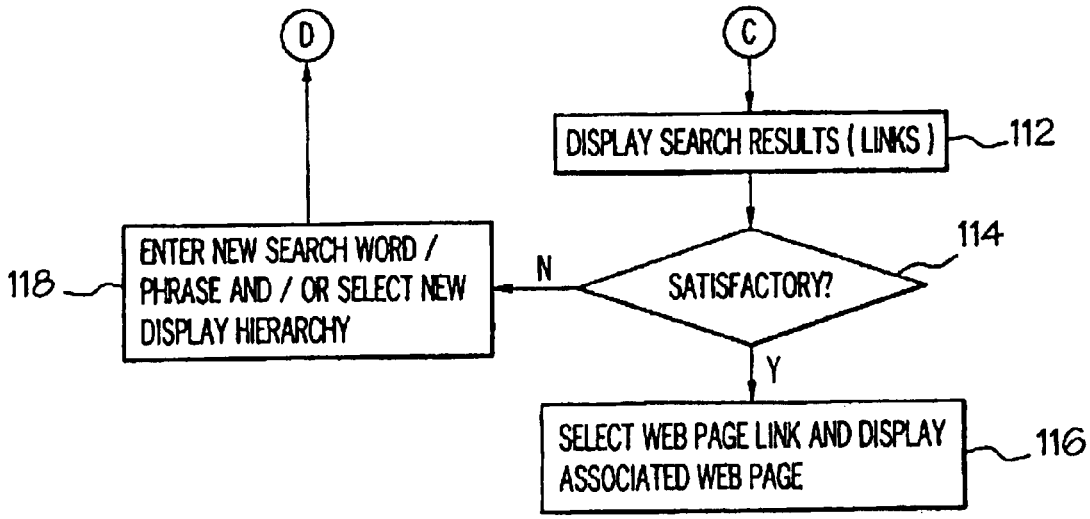

FIGS. 5A and 5B provides a flow chart representation of an operation of the embodiment described above in FIG. 4. As illustrated in the function block 94, a first step is to access a Web page on the Internet. In functional block 96, the next step is to determine whether the access Web pages includes an embedded categorical tag. If the Web page includes an embedded categorical tag the process would advance to functional block 98 where the process will determine whether the embedded categorical tag is consistent with the content of the Web page. If the Web page does not include an embedded categorical tag or if the categorical tag is not consistent with the content of the Web page, the process will advance to functional block 100 where a categorical tag will be created for the Web page. If the embedded categorical tag is consistent with the content of the Web page in step 98 or if the categorical tag is created for the Web page in step 100, the process will advance to functional block 102 where a searchable database record will be generated for the Web page. This searchable database record will include the non-common words or phrases contained within the Web page and their frequency (i.e., weight) a link to the Web page and the categorical tag embedded within the Web page or created in step 100 above. The process will then advance to functional block 104 to determine whether a next Web page is to be accessed. If so, the process will return to functional block 94. If the searchable database is complete, the process will advance to functional block 106 where a user will enter a search word or phase in selected display hierarchy.

Advancing the functional block 108, the search engine will search through database records for matches between the search word or phrase and the non-common word or phrases contained within the database records. Advancing to functional block 110 the search engine will then order the results of the search by applying the information in the categorical tags matching database records to the selected display hierarchy and/or by applying the weight of the search word or phrase in each of the matching database records to the selected display hierarchy. Advancing to functional block 112, the next step would involve displaying the search results on the display screen. In functional block 114, if the search results are satisfactory, the user will select a Web page link on the display screen and the search engine will display the associated Web page selected. If the search results are unsatisfactory, the process will advance to functional block 118 where the user will enter a new search word or phrase and/or select a new display hierarchy and the process will return to functional block 108 so that another search can be performed.

In the present embodiment, the expert rule sets for creating the categorical tags, and the database records may be defined by an expert utilizing an iterative variation of the above process on a limited portion of the Internet (similar to that as described in FIGS. 2A and 2B above). Once the rule sets have been refined, the rule sets can be applied to the entire Internet. The above described search engine can be operating on a Web site or may be contained in a memory device such as a CD ROM which can be downloaded onto a computer having access to the Internet.

TABLE 1

```
1) $line =~ m/<FONT FACE=\"Helvefica, Arial\" SIZE=\d >((\d)\.(\d\d|\d)?\.?(\d\d|\d)?\.?(\d\d|\d)?)*[a-zA-a\-\ \s]+)/
2) $line =~ m/<P ALIGN=\"CENTER\">(([IXVLDCM]+)\–([^<]+?))<\P>/
3) $line =~ m/<P
ALIGN=\"CENTER\">(Extract(s)?\s+from\s+Report\s+of\s+([IXVLDCM]+)(th|st)\s+ATCM[^<]*)\i
4) Simple variable substitution^aa/aa          A Hashtable is generated using the code:
#################################################################################################
    #          SUB: gen__hashes
    #
    #     Purpose: To generate a tables based on a set pattern from an
    #          files related to the Antarctic Treaty Project.
#################################################################################################
    sub gen__hashes
    {
            my $FileList = @__[0];
            print "FileList: $FileList<br>\n";
    print "Generating Year-Roman Numeral and Year-Major Document Name Hashes.\n\n";
    print "Processing";
            while ($InputFN = glob("$FileList"))
                    {
                    open (InFile, "<SInputFN")||die("Cannot open $InputFN\n$!");
                    print ".";
            while (defined($line = <InFile>))
                      {
                      chomp($line);
          # Remove unwanted characters from the line
        $line = rem__all($line);
        #    print $line;
          # Begin Matching
        # Attempt to grab the last for digits of a line, if they are on the line
        if ($line =~ m/^*\w+\w+\w+\w+|\w+\w+\w+), ?(\w+|\w+\w+|\w+\w+),? ?(\d|v\d\d)(
\w+)?–(\d|\d\d)(\w+)?\w+(\d\d\d\d)/)
```

TABLE 1-continued

```
            {
              # Debugging Code
                        #print "$1 $2 $3 $4 $5 $6 $7 $8 $9 $10\n";
                        $MajorDoc = $1;
              $year = $7;
        if ("$year"ne " ")
                {
                if (defined($NextLine = <InFile>))
                        {
                  # Remove unwanted characters from the line
                        $NextLine = rem__all($NextLine);
                # Match the Roman Numerals at the beginning of the
                # next line
                if($NextLine =~ m/^([IVXLCDM]+)\)
                        {
        $RomanNumeral = $1;
                        $YearTrans{$RomanNumeral} = $year;
                                        $DocTrans{$year} = $MajorDoc;
                                        }
                                }
                        }
              }
        }
        close InFile;
    }
    print "\n";
}
```

APPENDIX A

Then, when the Dewey tag is written out, the ATCM is placed in the appropriate position, whether it be the first, second, or third level using the Year from the currently matched pattern to obtain the correct ATCM from the hash-table (DocTrans table specifically) as generated above. 5) Simple variable substitutionaaa A Hashtable is generated using the code:

The following Appendix provides example code segments for dividing the Antarctic Treaty into a plurality of finite elements and for creating categorical tags for the finite elements.

```
#################################################################
    #           SUB: gen__hashes
    #
    #     Purpose: To generate a tables based on a set pattern from an
    #           files related to the Antarctic Treaty Project.
#################################################################
    sub gen$_{13}$ hashes
    {
                my $FileList = @__[0];
                print "FileList: $FileList<br>\n";
    print "Generating Year-Roman Numeral and
    Year-Major Document Name Hashes.\n\n";
    print "Processing";
                while ($InputFN = glob("$FileList"))
                        {
                        open (InFile,
                        "<$InputFN")||die("Cannot open $InputFN\n$!");
                        print ".";
                while (defined($line = <InFile>))
                        {
                        chomp($line);
          # Remove unwanted characters from the line
        $line = rem__all($line);
        #    print $line;
          # Begin Matching
        # Attempt to grab the last for digits of a line,
        if they are on the line
        if ($line =~ m/^*\w+\w+\w+\w+|\w+\w+\w+),
        ?(\w+|\w+\w+|\w+\w+),? ?(\d|v\d\d)(
```

-continued

```
\w+)?–(\d|\d\d)(\w+)?\w+(\d\d\d\d)/)
            {
              # Debugging Code
                        #print "$1 $2 $3 $4 $5 $6 $7 $8 $9 $10\n";
                        $MajorDoc = $1;
              $year = $7;
        if ("$year"ne " ")
                {
                if (defined($NextLine = <InFile>))
                        {
                  # Remove unwanted characters from the line
                        $NextLine = rem__all($NextLine);
                # Match the Roman Numerals at the
                beginning of the
                # next line
                if($NextLine =~ m/^([IVXLCDM]+)\)
                        {
        $RomanNumeral = $1;
                        $YearTrans{$RomanNumeral} = $year;
                                        $DocTrans{$year} = $MajorDoc;
                                        }
                                }
                        }
        }
    }
    close InFile;
  }
            print "\n";
}
```

Then, when the Dewey tag is written out, the Year is placed in the appropriate position, whether it be the first, second, or third level using the Roman Numeral from the currently matched pattern to obtain the correct Year from the hashtable (YearTrans table specifically) as generated above.

TABLE 2

1) <meta name="Dewey" content="Seventeenth Antarctic Consultative Meeting%%====%%%%====%%%%====%%%%====%% Article XII">
2) <meta name="Dewey" content="CONSERVATION OF ANTARCTIC TABLE 2-continued

| |
|---|
| MARINE LIVING RESOURCES%%====%%Convention on the Conservation of Antarctic%%====%%%%====%%%%====%% 1981 Article VI Relationship to existing conventions relating to the conservation of whales and seals"> |
| 3)<meta name="Dewey" content="Resolutions and Measures adopted at the XIXth Antarctic Treaty Consultative Meeting%%====%%Annex C%%====%%Resolutions%%====%%%%====%%Resolution 8"> |
| 4) <meta name="Dewey" content="Seventeenth Antarctic Consultative Meeting%%====%%%%====%%%%====%%%%====%% Article XII"> |
| 5) <meta name="Dewey" content="1980%%====%%Convention on the Conservation of Antarctic%%====%%%%====%%%%====%%1980 Article |

While the systems and methods described herein constitute preferred embodiments of the invention, it is to be understood that the invention is not limited to these precise forms, and that changes may be made therein without departing from the scope of the invention.

What is claimed is:

1. A method for generating a searchable informational resource comprising the steps of:

(a) dividing an informational resource *including at least one document* into a plurality of finite elements, the dividing step (a) being performed by an expert system according to a first rule set;

(b) assigning a categorical tag to each of the plurality of finite elements, the categorical tag including data pertaining to a content of the finite element, the assigning step (b) being performed by an expert system according to a second rule set;

(c) generating a searchable database record for each of the plurality of finite elements, each searchable database record including at least one *non-common* string contained within the finite element *and word frequency data pertaining to the frequency of the non-common words contained within the corresponding finite element*;

(d) [supplying] *receiving* a search string *including at least one search word*;

(e) searching the searchable database for searchable database records containing the search string so as to provide search results;

(f) arranging the results of the searching step in a hierarchal structure *including a collapsible/expandable hierarchy having at least two levels* according to the information in the categorical tags assigned to the finite elements corresponding to the searchable database records found in the searching step, *and ordering the results of the searching step according to a first one of the levels and further ordering the results of the searching step according to a next one of the levels, wherein at least one of the levels of the hierarchal structure is ordered based upon the data included in the categorical tags assigned to the finite elements that are associated with the database records found in the searching step* (*e*);

(g) displaying the results of the searching step in the hierarchal structure;

(h) modifying at least one of the first and second rule sets, responsive to viewing, by an expert having expert knowledge regarding content and structure of the informational resource, unsatisfactory results in the displaying step (g); and (i) repeating steps (a) through (h) until the expert views satisfactory results in the displaying step (g).

2. The method of claim 1, wherein the informational resource is a single document and the step of dividing the informational resource into a plurality of finite elements includes the step of identifying a plurality of sections in the single document, wherein each finite element is a single one of the plurality of sections.

3. The method of claim 1, wherein the informational resource is a plurality of documents and the step of dividing the informational resource into a plurality of finite elements includes the step of identifying the plurality of documents, wherein each finite element is a single one of the plurality of documents.

4. The method of claim 1, wherein the informational resource is a plurality of documents and the step of dividing the informational resource into a plurality of finite elements includes the step of identifying the plurality of documents and identifying sections within the plurality of documents, wherein each finite element *is associated with* an identified section.

5. The method of claim 4, wherein the identified section is an entire one of the plurality of documents.

6. The method of claim 1, wherein the informational resource is a data stream and the step of dividing the informational resource into a plurality of finite elements includes the step of identifying segments within the data stream.

7. The method of claim 1, wherein the categorical tag includes data pertaining to an organizational attribute of the finite element with respect to the informational resource.

8. The method of claim 1, wherein the categorical tag includes data pertaining to the location of the finite element.

9. The method of claim 1, wherein the categorical tag includes a categorical phrase pertaining to the content of the finite element.

10. The method of claim 1, wherein the categorical tag includes a categorical number pertaining to the content of the finite element.

11. The method of claim 10, wherein the categorical number is based upon a categorical referencing system analogous to the Dewey decimal system.

12. The method of claim 1, wherein the step of dividing the informational resource into a plurality of finite elements includes the step of identifying and distinguishing between headings and sub-headings within the informational resource.

13. The method of claim 1, wherein each database record further includes an address or link to the corresponding finite element.

[14. The method of claim 1, wherein the database record includes non-common strings contained within the finite element.]

[15. The method of claim 14, wherein:

the informational resource is at least one document;

the database record includes non-common words contained within the finite element; and the step of supplying a search string involves a step of assigning at least one search word.]

[16. The method of claim 15 wherein each database record further includes word frequency data pertaining to the frequency of the non-common words contained within the corresponding finite element.]

[17. The method of claim 16 wherein a hierarchal structure is a collapsible/expandable hierarchy, having at least two levels and the arranging step (f) involves the step of ordering the results of the searching step according to a first one of the levels and then further ordering the results of the searching step according to a next one of the levels.]

[18. The method of claim 17, wherein at least one of the levels of the hierarchal structure is ordered based upon the data included in the categorical tags assigned to the finite elements that are associated with the database records found in the searching step (e).]

19. The method of claim [18] *1*, wherein another one of the two levels of the hierarchal is ordered based upon the word frequency data for database records found in the searching step (e).

20. The method of claim 1 wherein a hierarchal structure is a collapsible/expandable hierarchy, having at least two levels and the arranging step (f) involves the step of ordering the results of the searching step according to a first one of the levels and then further ordering the results of the searching step according to a next one of the levels.

21. The method of claim 20, wherein at least one of the levels of the hierarchal structure is ordered based upon the data included in the categorical tags assigned to the finite elements that are associated with the database records found in the searching step (e).

22. The method of claim 1, wherein:

the informational resource includes a document;

the step of dividing the informational resource into a plurality of finite elements includes the step of identifying a plurality of sections in the document, each finite element being a single one of the plurality of sections the categorical tag includes information pertaining to a location of the finite element with respect to other finite elements in the document; and the step of arranging the results of the searching step in a hierarchal structure according to the information in the categorical tags assigned to the finite elements corresponding to the searchable database records found in the searching step, includes the step of arranging the finite elements in an order in which the finite elements appear in the document.

23. The method of claim 1, wherein step (b) includes the step of inserting each categorical tag into the respective one of the plurality of finite elements.

24. The method of claim 1, wherein step (c) includes the step of inserting each categorical tag into the database record corresponding to the respective one of the finite elements.

25. The method of claim 1, wherein the [supplying] *receiving* step (d) includes the steps of:

[providing] *receiving* an initial search string; and creating at least one additional search string having a substantially similar meaning or effect of the initial search string.

26. The method of claim 25, wherein the initial search string is a word in a first language and the at least one additional search string is the word in a second language.

27. The method of claim 25, wherein the initial search string is a word having a first meaning and the at least one additional search string is another word having a second meaning substantially similar to the first meaning.

28. The method of claim 25, wherein the at least one additional search string is based upon a known [permeation] *permutation* of the initial search string.

29. A method for retrieving information from an informational resource comprising the steps of:

breaking apart the informational resource into a plurality of discrete finite elements;

creating a categorical tag for each of the plurality of discrete finite elements, *the categorical tag including data pertaining to a content of the discrete finite element*;

generating a searchable database including a searchable database record for each of the discrete finite elements;

searching the searchable database for relevant database records;

associating the relevant database records with corresponding relevant, discrete finite elements;

selecting a hierarchy for displaying identifying phrases pertaining to the relevant, discrete finite elements;

ordering the relevant, discrete finite elements in the hierarchy according, at least in part, to the categorical tag created for each of the discrete finite elements;

displaying the identifying phrases pertaining to the relevant, discrete finite elements according to the results of the ordering step;

[selecting] *receiving a selection of* one of the identifying phrases;

accessing the discrete finite element corresponding to the selected identifying phrase; and constructing a new informational resource for viewing using the accessed, relevant discrete finite element and other related, discrete finite elements *including discrete finite elements corresponding to database records found in the searching step, and ordering the other related, discrete finite elements and the accessed, relevant discrete finite element according to information contained within the categorical tags of the other related, discrete finite elements and the accessed, relevant discrete finite element*.

30. The method of claim 29, wherein the other related, discrete finite elements are determined based upon information contained within the categorical tag of the accessed, relevant discrete finite element.

[31. The method of claim 29, wherein the other related, discrete finite elements include discrete finite elements corresponding to database records found in the searching step.]

[32. The method of claim 31, wherein the step of constructing the new informational resource includes the step of ordering the other related, discrete finite elements and the accessed, relevant discrete finite element according to information contained within the categorical tags of the other related, discrete finite elements and the accessed, relevant discrete finite element.]

*33. A computerized system for retrieving information from an informational resource comprising:*

*a computer including software operating thereon that comprises:*

*a break module, configured to break the informational resource into a plurality of finite elements and create a categorical tag for each finite element, the categorical tag including data pertaining to a content of the finite element:*

*an index module, configured to create a searchable database having a plurality of database records, each database record corresponding to at least one of the finite elements and including at least a portion of data contained in or pertaining to the finite element;*

*a search module, configured to compare a search query with each of the database records and determine which, if any, of the database records are relevant database records; and*

*an unbreak module configured to associate the relevant database records with their respective finite elements;*

*wherein said break module, index module, search module and unbreak module are each separate processing modules to provide a generally modular system;*

*wherein an identifying phrase pertaining to one of the finite elements is selected;*

*wherein the finite element corresponding to the selected identifying phrase is accessed;*

*wherein a new informational resource is constructed for viewing using the accessed, relevant finite element and other related finite elements determined based upon information contained within the categorical tag of the accessed, relevant finite element, wherein the other related finite elements include finite elements corresponding to the relevant database records; and*

*wherein the accessed, relevant finite element and other related finite elements are ordered according to the information contained within the categorical tags of the other related, finite elements and the accessed, relevant finite element.*

*34. A computer implemented method for retrieving information from an informational resource comprising one or more of the steps of:*

*breaking the informational resource into a plurality of discrete finite elements and creating a categorical tag for each discrete finite element, the categorical tag including data pertaining to a content of the discrete finite element, by a break module;*

*generating, by an index module, a searchable database including a searchable database record for each of the discrete finite elements;*

*searching, by a search module, the searchable database for relevant database records that correspond to a search query; and*

*associating the relevant database records with their respective discrete finite elements by an unbreak module;*

*wherein said break module, index module, search module and unbreak module are each separate processing modules to provide a generally modular system;*

*wherein a selection of an identifying phrase pertaining to one of the discrete finite elements is selected;*

*wherein the discrete finite element corresponding to the selected identifying phrase is accessed;*

*wherein a new informational resource is constructed for viewing using the accessed, relevant discrete finite element and other related discrete finite elements determined based upon information contained within the categorical tag of the accessed, relevant discrete finite element, wherein the other related discrete finite elements include discrete finite elements corresponding to the relevant database records found in the searching step; and*

*wherein the accessed, relevant discrete finite element and other related discrete finite elements are ordered according to the information contained within the categorical tags of the other related, discrete finite elements and the accessed, relevant discrete finite element.*

*35. A storage device for operating on a computer system for processing an informational resource, the storage device comprising a break module adapted to be executed by a central processing unit and configured to break the informational resource into a plurality of finite elements and to create a categorical tag for each of the finite elements, the categorical tag including data pertaining to a content of the finite element;*

*wherein an identifying phrase pertaining to one of the finite elements is selected;*

*wherein the finite element corresponding to the selected identifying phrase is accessed; and*

*wherein a new informational resource is constructed for viewing in an expandable/collapsible hierarchal structure using the accessed, relevant finite element and other related finite elements; and*

*wherein said break module is configured to be used with at least one of:*

*an index module, configured to create a searchable database having a plurality of database records, each database record corresponding to at least one of the finite elements and including at least a portion of data contained in or pertaining to the finite element;*

*a search module configured to compare a search query with each of the database records and determine which, if any, of the database records are relevant database record; or*

*an unbreak module configured to associate the relevant database records with their respective finite elements, the unbreak module being further configured to receive an input selecting at least one of the displayed identifying information to thereby select an associated finite element, and configured to reconstruct a contiguous portion of the informational resource or informational resources around the finite element corresponding to the selected displayed identifying information by displaying other finite elements that are contiguous to the selected finite element.*

*36. The storage device of claim 35 wherein each categorical tag includes information pertaining to at least one of: the location of the informational resource; origination of the informational resource; the location of the discrete finite element within a storage domain; knowledge space or collection or system; the location of the discrete finite element relative to other discrete finite elements of the informational resource; informational content contained in or pertaining to the discrete finite element; organization data pertaining to the placement of the finite element within an organizational framework of the informational resource; author data; owner data; or timing data.*

*37. The storage device of claim 35 wherein each finite element has a variable characteristic taken from a group consisting of a unit size, type, shape or data boundary.*

*38. The storage device of claim 35 wherein said break module breaks said information resource into a plurality of finite elements based upon at least one set of rules that are defined by an expert or artificial intelligence.*

*39. The storage device of claim 38 wherein said rule set determines a characteristic of each finite element taken from a group consisting of: a unit size, type, shape or data boundary.*

*40. The storage device of claim 35 wherein said break module is configured to track the position of each finite element relative to other finite elements of said informational resource.*

*41. The storage device of claim 35 wherein each finite element has an associated database record which includes at least a portion of data contained in or pertaining to the finite element; selected ones of said database records are identified as relevant database records; and the system further includes an unbreak module configured to associate the relevant database records with their respective finite elements.*

*42. A computerized system comprising:*

*a computer for processing at least part of an informational resource or combination of informational resources which are broken down into a plurality of discrete finite elements, each discrete finite element including a categorical tag and having an associated*

*database record which includes at least a portion of data pertaining to a content of the finite element, selected ones of said database records being identified as relevant database records, said computer including software device operating thereon that includes an unbreak module configured to associate the relevant database records with their respective discrete finite elements;*

*wherein said unbreak module is configured to arrange the relevant database records or their respective discrete finite elements in a hierarchal structure according, at least in part, to the information in the categorical tags, and further configured to display identifying information pertaining to the respective discrete finite elements of the relevant database records and receive an input selecting at least one of the displayed identifying information;*

*wherein an identifying phrase pertaining to one of the discrete finite elements is selected;*

*wherein the discrete finite element corresponding to the selected identifying phrase is accessed;*

*wherein a new informational resource is constructed by the unbreak module for viewing using the accessed, relevant discrete finite element and other related discrete finite elements; and*

*wherein said unbreak module is configured to reconstruct a contiguous portion of the informational resource around the discrete finite element corresponding to the selected identifying information by displaying other discrete finite elements that are contiguous to the discrete finite element corresponding to the selected identifying information, and wherein the unbreak module is configured to reconstruct the portion of the informational resource by reviewing the categorical tag assigned to the discrete finite element corresponding to the selected identifying information for data corresponding to the location of the selected discrete finite element with respect to the information resource as a whole.*

*43. The system of claim 42 wherein each discrete finite element includes a categorical tag, and wherein said unbreak module is configured to arrange the relevant database records or their respective discrete finite elements in a hierarchal structure according, at least in part, to the information in the categorical tags.*

*44. The system of claim 43 wherein the levels and organization of levels of said hierarchal structure are determined by at least one rules that are defined by an expert or artificial intelligence.*

*45. The system of claim 43 wherein said hierarchal structure is an expandable/collapsible hierarchal structure which can be collapsed or expanded by an end user.*

*46. The system of claim 43 wherein said unbreak module is configured to receive a selection of a hierarchal structure and display identifying information pertaining to the relevant database records or their respective discrete finite elements in the received hierarchal structure.*

*47. The system of claim 42 wherein the unbreak module is configured to construct a new document by identifying, linking or displaying at least two or more discrete finite elements that are not contiguous in an original information resource.*

*48. The system of claim 42 further including a break software module operating thereon that is configured to break the informational resource or combination of informational resources into the plurality of discrete finite elements and to create a categorical tag for each of the plurality of discrete finite elements, the categorical tag including information pertaining to at least one of: the location of the informational resource; origination of the informational resource; the location of the discrete finite element within a storage domain; knowledge space or collection or system; the location of the discrete finite element relative to other discrete finite elements of the informational resource; informational content contained in or pertaining to the discrete finite element; organization data pertaining to the placement of the discrete finite element within an organizational framework of the informational resource; author data; owner data; and timing data.*

*49. A method for retrieving information from an informational resource including the steps of:*

*breaking the informational resource into a plurality of discrete finite elements having at least one of a variable unit size, type, shape or data boundary, the breaking step being performed by an expert system according to a first rule set;*

*creating a categorical tag for each discrete finite element, the categorical tag including data pertaining to a content of the discrete finite element, the creating step being performed by an expert system according to a second rule set;*

*generating a searchable database including a searchable database record for each of the discrete finite elements;*

*receiving a search query;*

*searching the searchable database for relevant database records that correspond to the search query;*

*displaying the results of the searching step;*

*arranging the results of said searching step in a hierarchal structure according, at least in part, to the information in the categorical tags assigned to the discrete finite elements corresponding to the relevant database records, wherein said hierarchal structure is an expandable/collapsible hierarchal structure which can be collapsed or expanded by an end user;*

*modifying at least one of the first and second rule sets, responsive to viewing, by an expert having expert knowledge regarding content and structure of the informational resource, unsatisfactory results in the displaying step; and*

*repeating the foregoing steps until the expert views satisfactory results in the displaying step.*

*50. The method of claim 49 wherein each categorical tag includes information pertaining to at least one of the location of the informational resource; origination of the informational resource; the location of the discrete finite element within a storage domain; knowledge space or collection or system; the location of the discrete finite element relative to other discrete finite elements of the informational resource; informational content contained in or pertaining to the discrete finite element; organization data pertaining to the placement of the discrete finite element within an organizational framework of the informational resource; author data; owner data; or timing data.*

*51. The method of claim 49 wherein the at least one unit size, type, shape or data boundary of each discrete finite element is defined prior to said breaking step by at least one set of rules that are defined by an expert or artificial intelligence.*

*52. The method of claim 49 wherein the at least one unit size, type, shape or data boundary of each discrete finite element is defined by at least one set of rules that are defined by an expert or artificial intelligence.*

*53. The method of claim 49 wherein each searchable database record includes a reverse index which includes infor-*

*mation pertaining to at least one of: the location of the discrete finite element relative to other discrete finite elements or a word, number or other symbol frequency data pertaining to a frequency of certain words, numbers or other symbols contained in the corresponding discrete finite element.*

*54. The method of claim 49 further comprising the step of associating the relevant database records with their respective discrete finite elements.*

*55. The method of claim 49 further comprising the step of receiving a selection of a hierarchal structure and displaying identifying information pertaining to the discrete finite elements that correspond to the relevant database records, and wherein said arranging step arranges the results of said searching step in the received hierarchal structure.*

*56. The method of claim 54 further including the steps of displaying identifying information pertaining to the respective discrete finite elements of the relevant database records produced during the associating step and receiving an input selecting at least one of the displayed identifying information to thereby select -at least one discrete finite element.*

*57. The method of claim 56 further including the steps of reconstructing a contiguous portion of the informational resource around the selected discrete finite element by displaying other discrete finite elements that are contiguous to the selected discrete finite element.*

*58. The method of claim 57 wherein the reconstructing step includes reviewing the categorical to assigned to the selected discrete finite element for data corresponding to the location of the selected discrete finite element with respect to the information resource.*

*59. The method of claim 49 wherein said categorical tag includes a categorical designation pertaining to informational content contained in or pertaining to the discrete finite element, and wherein the categorical designation includes a unique identifier for each discrete finite element.*

*60. The method of claim 49 wherein said breaking step includes tracking the position of each discrete finite element relative to other finite elements of said informational resource.*

*61. The method of claim 49 wherein said creating step includes inserting said categorical tag into the respective one of the plurality of discrete finite elements.*

*62. The method of claim 49 wherein said informational resource is at least one of a document, plurality of documents, a web page, a plurality of web pages, or a data stream.*

*63. A computerized system for retrieving information from an informational resource comprising:*

*a computer including software operating thereon that comprises:*

*a break module, configured to break the informational resource into a plurality of finite elements having a variable characteristic that is defined prior to said breaking step by at least one set of predefined rules that are defined by an expert or artificial intelligence and to create a categorical tag for each of the finite elements, the categorical tag including data pertaining to a content of the finite element, the characteristic being taken from a group consisting of a unit size, type, shape or data boundary;*

*an index module, configured to create a searchable database having a plurality of database records, each database record corresponding to at least one of the finite elements and including at least a portion of data contained in or pertaining to the finite element; and*

*a search module, configured to compare a search query with each of the database records and determine which, if any, of the database records are relevant database records;*

*wherein an identifying phrase pertaining to one of the finite elements is selected;*

*wherein the finite element corresponding to the selected identifying phrase is accessed;*

*wherein a new informational resource is constructed for viewing using the accessed, relevant finite element and other related finite elements determined based upon information contained within the categorical tag of the accessed, relevant finite element and include finite elements corresponding to the relevant database records; and*

*wherein the accessed, relevant finite element and other related finite elements are ordered according to the information contained within the categorical tags of the other related, finite elements and the accessed, relevant finite element.*

*64. A method for retrieving information from an informational resource including the steps of*

*breaking the informational resource into a plurality of discrete finite elements, the breaking step being performed by an expert system according to a first rule set;*

*creating a categorical tag for each discrete finite element, the categorical tag including data pertaining to a content of the discrete finite element, the creating step being performed by an expert system according to a second rule set;*

*generating a searchable database including a searchable database record for each of the discrete finite elements, each database record including information pertaining to each associated discrete finite element or categorical tag such that the content of each associated discrete finite element or categorical tag are generally comprehensively searchable;*

*receiving a search query;*

*searching the searchable database for relevant database records that correspond to the search query;*

*displaying the results of the searching step;*

*displaying identifying information pertaining to the respective discrete finite elements of the relevant database records and receiving an input selecting at least one of the displayed identifying information to select at least one discrete finite element;*

*reconstructing a contiguous portion of the informational resource around the selected discrete finite element by displaying other discrete finite elements that are contiguous to the selected discrete finite element, the reconstructing including reviewing the categorical tag assigned to the selected discrete finite element for data corresponding to the location of the selected discrete finite element with respect to the information resource;*

*modifying at least one of the first and second rule sets, responsive to viewing, by an expert having expert knowledge regarding content and structure of the informational resource, unsatisfactory results in the displaying step; and*

*repeating the foregoing steps until the expert views satisfactory results in the displaying step.*

*65. The method of claim 64 wherein each categorical tag includes information pertaining to at least one of the location of the informational resource; origination of the informational resource; the location of the discrete finite element within a storage domain; knowledge space or collection or system; the location of the discrete finite element relative to*

*other discrete finite elements of the informational resource; informational content contained in or pertaining to the discrete finite element, organization data pertaining to the placement of the discrete finite element within an organizational framework of the informational resource; author data; owner data; or timing data.*

*66. The method of claim 64 wherein each database record includes information pertaining to generally all informational content contained in or pertaining to the associated discrete finite element or categorical tag to provide a generally content comprehensive database.*

*67. The method of claim 64 wherein said informational resource includes words, numbers, or symbols, and wherein said database record includes information pertaining to generally all the words, numbers or other symbols of said informational resource.*

*68. The method of claim 64 wherein each discrete finite element includes symbolic units, and wherein said database record includes a representation of generally all of the symbolic units of each discrete finite element such that said searching step includes searching generally all of the symbolic units of each discrete finite element.*

*69. The method of claim 68 wherein said symbolic units include at least one of words, numbers or other symbols.*

*70. The method of claim 64 wherein each searchable database record includes a reverse index which includes information pertaining to at least one of the location of the discrete finite element relative to other discrete finite elements; word, number or other symbol frequency data pertaining to a frequency of certain words, numbers or other symbols contained in the corresponding discrete finite element; the location of the informational resource; origination of the informational resource; the location of the discrete finite element within a storage domain, knowledge space or collection or system; the location of the discrete finite element relative to other discrete finite elements of the informational resource; informational content contained in or pertaining to the discrete finite element; organization data pertaining to the placement of the discrete finite element within an organizational framework of the informational resource; author data; owner data; or timing data.*

*71. The method of claim 64 further comprising the step of associating the relevant database records with their respective discrete finite elements.*

*72. The method of claim 64 further comprising the step of arranging the results of said searching step in a hierarchal structure according, at least in part, to the information in the categorical tags assigned to the finite elements corresponding to the relevant database records.*

*73. The method of claim 72 wherein said hierarchal structure is an expandable/collapsible hierarchal structure which can be collapsed or expanded by an end user.*

*74. The method of claim 72 further comprising the step of receiving a selection of a hierarchal structure and displaying identifying information pertaining to the discrete finite elements that correspond to the relevant database records, and wherein said arranging step arranges the results of said searching step in the received hierarchal structure.*

*75. The method of claim 64 wherein said categorical tag includes a categorical designation pertaining to informational content contained in or pertaining to the discrete finite element, and wherein the categorical designation includes a unique identifier for each discrete finite element.*

*76. The method of claim 64 wherein said breaking step includes tracking the position of each discrete finite element relative to other discrete finite elements of said informational resource.*

*77. The method of claim 64 wherein said creating step includes inserting said categorical tag into the respective one of the plurality of discrete finite elements.*

*78. The method of claim 64 wherein said informational resource is at least one of a document, plurality of documents, a web page, a plurality of web pages, or a data stream.*

*79. A computerized system for retrieving information from an informational resource comprising:*

*a computer including software operating thereon that comprises:*

*a break module, configured to break the informational resource into a plurality of finite elements using an expert system according to a first rule set and to create a categorical tag for each of the finite elements using an expert system according to a second rule set, the categorical tag including data pertaining to a content of the finite element;*

*an index module, configured to create a searchable database having a plurality of database records, each database record corresponding to at least one of the finite elements and including information pertaining to each associated finite element or categorical to such that the content of each associated finite element or categorical tag are generally comprehensively searchable; and*

*a search module, configured to compare a search query with each of the database records and determine which, if any, of the database records are relevant database records, to display the results of the search, to display identifying information pertaining to the respective finite elements of the relevant database records, and receive an input selecting at least one of the displayed identifying information to thereby select at least one finite element;*

*wherein at least one of the first and second rule sets is modified, responsive to viewing, by an expert having expert knowledge regarding content and structure of the informational resource, unsatisfactory results in the displayed results until the expert views satisfactory results in the displayed results; and*

*wherein a contiguous portion of the informational resource around the selected finite element is constructed by displaying other finite elements that are contiguous to the selected finite element, the constructing including reviewing the categorical tag assigned to the selected finite element for data corresponding to the location of the selected finite element with respect to the information resource.*

*80. The system of claim 79 wherein each finite element includes symbolic units, and wherein said database record includes a representation of generally all of the symbolic units of a finite element or categorical tag such that said search module can search generally all of the symbolic units of a finite element.*

*81. A data storage device comprising:*

*a computer including software operating thereon that comprises:*

*an informational resource divided into a plurality of finite elements by an expert system according to a first rule set, each of the finite elements including a categorical tag and a database record assigned thereto, the categorical tag including data pertaining to a content of the finite element, the categorical tag being created by an expert system according to a second rule set, the database record including information pertaining to each associated finite element*

*or categorical tag such that the content of each associated finite element or categorical tag are generally comprehensively searchable; and*

*software instructions programmed to direct retrieval and display of at least a portion of the informational resource, the software instructions being configured to perform the steps of:*

*receiving a search query;*

*searching through the database records for relevant database records matching the search query;*

*displaying the results of the searching step;*

*receiving a selection of one of the results of the searching step;*

*accessing the finite element corresponding to the selected result; and*

*constructing a new informational resource for viewing using the accessed, relevant finite element and other related, finite elements including finite elements corresponding to results found in the searching step, and ordering the other related, finite elements and the accessed, relevant finite element according to information contained within the categorical tags of the other related, finite elements and the accessed, relevant finite element;*

*wherein the step of constructing the new informational resource includes the step of ordering the other related, finite elements and the accessed, relevant finite element according to information contained within the categorical tags of the other related, finite elements and the accessed, relevant finite element;*

*wherein at least one of the first and second rule sets is modified, responsive to viewing, by an expert having expert knowledge regarding content and structure of the informational resource, unsatisfactory results in the displaying step; and*

*wherein the foregoing steps are repeated until the expert views satisfactory results in the displaying step.*

*82. The device of claim 81 wherein each finite element includes symbolic units, and wherein said database record includes a representation of generally all of the symbolic units of each finite element such that said searching step includes searching generally all of the symbolic units of each finite element.*

*83. A method for retrieving information from an informational resource including the steps of:*

*breaking the informational resource into a plurality of discrete finite elements, the breaking step being performed by an expert system according to a first rule set;*

*creating a categorical tag for each discrete finite element, the categorical tag including data pertaining to a content of the discrete finite element, the creating step being performed by an expert system according to a second rule set;*

*generating a searchable database including a searchable database record for each of the discrete finite elements;*

*receiving a search query;*

*searching the searchable database for relevant database records that correspond to the search query;*

*associating the relevant database records with their respective discrete finite elements;*

*displaying identifying information pertaining to the relevant discrete finite elements produced during said associating step in an expandable/collapsible hierarchal structure such that the expandable/collapsible hierarchy defines relationships within or between the informational resource or informational resources from which the relevant discrete finite elements originated, or within or between relevant discrete finite elements;*

*receiving an input selecting at least one of the displayed identifying information;*

*reconstructing a contiguous portion of the informational resource around a discrete finite element corresponding to a selected displayed identifying information by displaying other discrete finite elements that are contiguous to the selected discrete finite element;*

*constructing a new document including the discrete finite element corresponding to a selected displayed identifying information by combining said corresponding discrete finite element with another discrete finite element;*

*modifying at least one of the first and second rule sets, responsive to viewing, by an expert having expert knowledge regarding content and structure of the informational resource, unsatisfactory results in the displaying step; and*

*repeating the foregoing steps until the expert views satisfactory results in the displaying step.*

*84. The method of claim 83 wherein each categorical tag includes information pertaining to at least one of the location of the informational resource; origination of the informational resource; the location of the discrete finite element within a storage domain; knowledge space or collection or system; the location of the discrete finite element relative to other discrete finite elements of the informational resource; informational content contained in or pertaining to the discrete finite element; organization data pertaining to the placement of the discrete finite element within an organizational framework of the informational resource; author data; owner data; or timing data.*

*85. The method of claim 84 wherein each discrete finite element includes at least one variable characteristic that is defined by at least one set of predefined rules prior to said breaking step; the at least one variable characteristic take from a group consisting of a unit size, type, shape or data boundary.*

*86. The method of claim 83 wherein each searchable database record includes a reverse index which includes information pertaining to at least one of the location of the discrete finite element relative to other discrete finite elements; word, number or other symbol frequency data pertaining to a frequency of certain words, numbers or other symbols contained in the corresponding discrete finite element; the location of the informational resource; origination of the informational resource; the location of the discrete finite element within a storage domain, knowledge space or collection or system; the location of the discrete finite element relative to other discrete finite elements of the informational resource; informational content contained in or pertaining to the discreet finite element; organization data pertaining to the placement of the discrete finite element within an organizational framework of the informational resource; author data; owner data; and timing data.*

*87. The method of claim 83 wherein said hierarchal structure is an expandable/collapsible hierarchal structure which can be collapsed or expanded by an end user.*

*88. The method of claim 83 wherein said categorical tag includes a categorical designation pertaining to informational content contained in or pertaining to the discrete finite element, and wherein the categorical designation includes a unique identifier for each discrete finite element.*

*89. The method of claim 83 wherein said breaking step includes the step of tracking the position of each discrete finite element relative to other discrete finite elements of said informational resource or a plurality of informational resources.*

*90. The method of claim 83 wherein said creating step includes the step of inserting said categorical tag into the respective one of the plurality of discrete finite elements.*

*91. The method of claim 83 wherein said informational resource is at least one of a document, plurality of documents, a web page, a plurality of web pages, or a data stream.*

*92. A computerized system for retrieving information from an informational resource or resources comprising:*

*a computer including software operating thereon that comprises:*

*a break module, configured to break the informational resource into a plurality of discrete finite elements and to create a categorical tag for each of the discrete finite elements, the categorical tag including data pertaining to a content of the discrete finite element;*

*an index module, configured to create a searchable database having a plurality of database records, each database record corresponding to at least one of the discrete finite elements and including at least a portion of data contained in or pertaining to the discrete finite element;*

*a search module, configured to compare a search query with each of the database records and determine which, if any, of the database records are relevant database records;*

*an unbreak module configured to associate the relevant database records with their respective discrete finite elements, wherein said system is configured to display identifying information pertaining to the relevant discrete finite elements produced by said search module in an expandable/collapsible hierarchal structure such that the expandable/collapsible hierarchy defines relationships within or between the informational resource or informational resources from which the relevant discrete finite elements originated, or within or between relevant discrete finite elements, the unbreak module being further configured to receive an input selecting at least one of the displayed identifying information to thereby select an associated discrete finite element, and configured to reconstruct a contiguous portion of the informational resource or informational resources around the discrete finite element corresponding to the selected displayed identifying information by displaying other discrete finite elements that are contiguous to the selected discrete finite element;*

*wherein an identifying phrase pertaining to one of the discrete finite elements is selected;*

*wherein the discrete finite element corresponding to the selected identifying phrase is accessed; and*

*wherein a new informational resource is constructed for viewing using the accessed, relevant discrete finite element and other related discrete finite elements.*

*93. The system of claim 92 wherein each categorical tag includes information pertaining to at least one of the location of the informational resource; origination of the informational resource; the location of the discrete finite element within a storage domain; knowledge space or collection or system; the location of the discrete finite element relative to other discrete finite elements of the informational resource; informational content contained in or pertaining to the discrete finite element; organization data pertaining to the placement of the discrete finite element within an organizational framework of the informational resource; author data; owner data; or timing data.*

*94. The system of claim 92 wherein each discrete finite element includes at least one variable characteristic that is defined by at least one predefined set of rules prior to said breaking step; the at least one variable characteristic taken from a group consisting of a unit size, type, shape or data boundary.*

*95. The system of claim 92 wherein each searchable database record includes a reverse index which includes information pertaining to at least one of the location of the discrete finite element relative to other discrete finite elements or word, number or other symbol frequency data pertaining to a frequency of certain words, numbers or other symbols contained in the corresponding discrete finite element.*

*96. The system of claim 92 wherein said categorical tag includes a categorical designation pertaining to informational content contained in or pertaining to the associated discrete finite element, and wherein the categorical designation includes a unique identifier for each discrete finite element or a plurality of informational resources.*

*97. The system of claim 92 wherein said unbreak module is configured to track the position of each discrete finite element relative to other discrete finite elements of said informational resource.*

*98. The system of claim 92 wherein said index module inserts said categorical tag into the respective one of the plurality of discrete finite elements.*

*99. The system of claim 92 wherein said informational resource is at least one of a document, plurality of documents, a web page, a plurality of web pages, or a data stream.*

* * * * *

UNITED STATES PATENT AND TRADEMARK OFFICE

CERTIFICATE OF CORRECTION

PATENT NO. : RE42,167 E
APPLICATION NO. : 10/346505
DATED : February 22, 2011
INVENTOR(S) : George J. Morgan, III It is certified that error appears in the above-identified patent and that said Letters Patent is hereby corrected as shown below:

Column 17, claim 1, line 60, “structure” should be changed to --structures--.

Column 20, claim 33, line 47, “element:” should be changed to --element;--.

Column 21, claim 34, line 36, “selected” should be changed to --received--.

Signed and Sealed this
Twelfth Day of April, 2011

David J. Kappos

David J. Kappos
*Director of the United States Patent and Trademark Office*